US009777848B2

(12) United States Patent
Drott et al.

(10) Patent No.: US 9,777,848 B2
(45) Date of Patent: Oct. 3, 2017

(54) COMMON MOTOR DRIVEN DUAL BUTTERFLY VALVES

(71) Applicant: CONTINENTAL AUTOMOTIVE GMBH, Hannover (DE)

(72) Inventors: Christoph Drott, Schaafheim (DE); Rainer Johannes Montigny, Bad Soden (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/654,388

(22) PCT Filed: Dec. 11, 2013

(86) PCT No.: PCT/EP2013/076227

§ 371 (c)(1),
(2) Date: Jun. 19, 2015

(87) PCT Pub. No.: WO2014/095520

PCT Pub. Date: Jun. 26, 2014

(65) Prior Publication Data

US 2015/0345647 A1 Dec. 3, 2015

(30) Foreign Application Priority Data

Dec. 21, 2012 (DE) ........................ 10 2012 224 232

(51) Int. Cl.
*F16K 11/052* (2006.01)
*F16K 31/04* (2006.01)
(Continued)

(52) U.S. Cl.
CPC ........ *F16K 11/0525* (2013.01); *F02D 9/1065* (2013.01); *F02M 26/64* (2016.02);
(Continued)

(58) Field of Classification Search
CPC .. F16K 11/0525; F16K 11/165; F16K 31/524; F16K 31/04; F16K 31/521;
(Continued)

(56) References Cited

U.S. PATENT DOCUMENTS 2,986,949 A * 6/1961 Lancaster ............ B23Q 16/025 74/567
2011/0023846 A1* 2/2011 Miyazaki ........... F02M 25/0702 123/568.16
2012/0272646 A1* 11/2012 Moritani ................ F02M 26/70 60/605.2

FOREIGN PATENT DOCUMENTS

DE 499 691 6/1930
DE 10 2011 053664 4/2012

(Continued)

*Primary Examiner* — Jessica Cahill
*Assistant Examiner* — Daphne M Barry
(74) *Attorney, Agent, or Firm* — Cozen O'Connor

(57) ABSTRACT

A valve having a housing in which three ducts that are connected to each another are arranged, one flap, which is mounted rotatably on a shaft is arranged in each of two ducts, an electric motor which drives a shaft by a gearing system, and a transmission mechanism, which drives the second flap depending on the movement of the first flap. On the shaft of the first flap, a cam disc is arranged, on the circumference of which a lever rests, which is connected in a rotationally fixed manner to the shaft of the second flap.

6 Claims, 1 Drawing Sheet

(51) Int. Cl.

| | |
|---|---|
| ***F16K 31/524*** | (2006.01) |
| ***F16K 31/52*** | (2006.01) |
| ***F16K 11/16*** | (2006.01) |
| ***F02D 9/10*** | (2006.01) |
| ***F02M 26/64*** | (2016.01) |
| *F02D 9/02* | (2006.01) |

(52) U.S. Cl.

CPC ............ *F16K 11/165* (2013.01); *F16K 31/04* (2013.01); *F16K 31/521* (2013.01); *F16K 31/524* (2013.01); *F02D 9/109* (2013.01); *F02D 2009/0205* (2013.01); *Y10T 137/86847* (2015.04)

(58) Field of Classification Search

CPC ................... F02D 9/1065; F02D 9/109; F02D 2009/0205; Y10T 137/86847; Y02T 10/121

USPC ..................................... 137/637, 637.1, 875

See application file for complete search history.

(56) References Cited

FOREIGN PATENT DOCUMENTS

| | | |
|---|---|---|
| EP | 2 042 723 | 4/2009 |
| EP | 2 317 111 | 5/2011 |
| EP | 2 497 921 | 9/2012 |

* cited by examiner

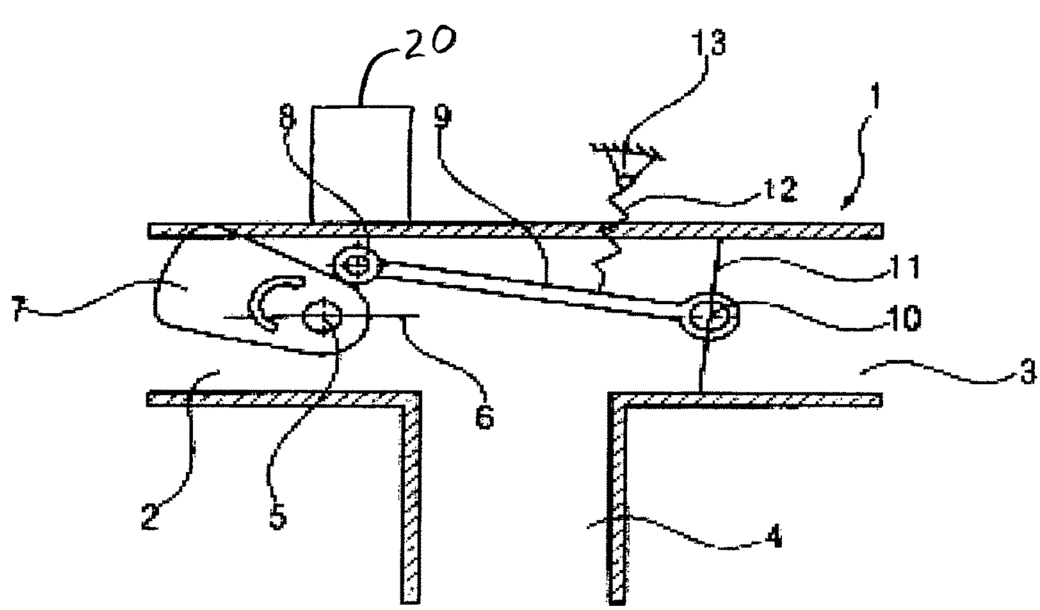
20
13
8
9
1
12
11
7
10
3
6
2
5
4

COMMON MOTOR DRIVEN DUAL BUTTERFLY VALVES

CROSS REFERENCE TO RELATED APPLICATIONS

This is a U.S. national stage of application No. PCT/EP2013/076227, filed on Dec. 11, 2013. Priority is claimed on German Application No. DE102012224232.5, filed Dec. 21, 2012, the content of which is incorporated here by reference.

BACKGROUND OF THE INVENTION

1. Field of the Invention

The subject matter of the invention is a three-way valve having a housing, in which three ducts that are connected to one another are arranged having one flap that is mounted rotatably on a shaft is arranged in each of two ducts, an electric motor that drives a shaft via a gear mechanism, and a transmission mechanism that drives the second flap depending on the movement of the first flap.

2. Detailed Description of the Prior Art

Housings of this type are used as air and exhaust gas valves in motor vehicles and are therefore known. Gas streams flow through the ducts with the flaps, which gas streams are to be fed to the third duct individually or in a mixed manner in certain conditions depending on the situation. This means that the rotational angle of the first flap is assigned a certain rotational angle of the second flap. Accordingly, the rotational angle of the first flap corresponds to a certain operating situation, to which the rotational angle of the second flap has to be adapted. The adaptation of the rotational angle of the first flap to the corresponding operating situation is realized by the actuation of an electric motor. The corresponding adjustment of the second flap by a transmission mechanism. To this end, it is known to arrange a disk which has a closed slot on the shaft, on which the first flap is fastened. A cam is arranged in said slot, which cam moves in said slot during a rotation of the disk. The movement of said cam is transmitted to the shaft of the second flap. The slot corresponds to a control cam in the manner of a slotted guide, and the cam corresponds to the sliding block. A disadvantage of this configuration is that, as a result of the slot being arranged completely within the circumference of the disk, said disk can have very large external dimensions, as a result of which the valve requires a large amount of installation space.

SUMMARY OF THE INVENTION

An object of the invention is providing a valve that requires less installation space, which is achieved with a cam disk arranged on the shaft of the first flap, a lever that bears against the circumference of the cam disk, and that the lever is connected fixedly to the shaft of the second flap to rotate with it.

During the rotation of the cam disk and therefore of the first flap, the lever and therefore the shaft of the second flap are moved depending on the rotation of the first flap. Here, any desired movement profiles can be reproduced via the cam disk. Since said movement profiles can be stored on the circumference of the cam disk, the cam disk can be of relatively small design. In this way, the valve according to the invention requires a relatively small amount of installation space in the region of the transmission mechanism. Said valve also has less wear on due to the lower friction in the transmission mechanism. In addition, said valve does not require a coupling between the shafts.

In one advantageous refinement, the low-friction transmission of the movement profile is achieved by a rotatable roller arranged at that end of the lever that faces the cam disk.

The arrangement of the roller requires a particularly small additional amount of installation space if the roller is a needle bearing.

To ensure the constant contact between the lever or the roller and the cam disk, a spring presses the lever against the cam disk.

BRIEF DESCRIPTION OF THE DRAWINGS

The invention is described in greater detail using one exemplary embodiment. In the drawing:

The FIGURE is a diagrammatic illustration of a valve.

DETAILED DESCRIPTION OF THE PRESENTLY PREFERRED EMBODIMENTS

As shown in the FIGURE valve has a housing 1, in which three ducts 2-4 are arranged. Gas streams can flow via the two horizontal ducts 2, 3 into the duct 4. The shaft 5 and therefore the first flap 6 are driven via an electric motor 20 (shown structurally). A cam disk 7 is fastened on the shaft 5, the circumference of which cam disk 7 defines the pivoting angle of the second flap 11. To this end, a needle bearing 8 traverses the circumference of the cam disk 7. The needle bearing 8 is fastened to a lever 9, and the latter is connected fixedly to the shaft 10 of the second flap 11 so as to rotate with it. The lever 9 is pressed against the cam disk 7 via a spring 12, which is supported on a housing-side stop 13.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:

a housing, in which three ducts are arranged that are connected to one another;

a first shaft rotatably mounted in one of the three ducts;

a first flap mounted on the first shaft;

a second shaft arranged in another of the three ducts;

a second flap mounted on the second shaft;

an electric motor configured to drive the first shaft of the first flap;

a housing side stop;

a spring having a first end arranged to press a lever against an outer circumferential surface of a cam disk and a second end arranged at the housing side stop; and a transmission mechanism that drives the second flap based on a movement of the first flap that comprises:

the cam disk arranged on the first shaft of the first flap; and the lever that bears against a circumference of the cam disk, the lever is fixedly connected to the second shaft of the second flap so that the lever rotates with the second shaft of the second flap.

2. The valve as claimed in claim 1, further comprising a gear mechanism that couples the electric motor to the first shaft.

3. The valve as claimed in claim 1, further comprising a rotatable roller arranged at an end of the lever that faces the cam disk.

4. The valve as claimed in claim 3, wherein the rotatable roller is a needle bearing.

5. The valve as claimed in claim 3, wherein the housing is T-shaped, wherein a first duct is perpendicular to a second duct and a third duct.

6. A valve comprising:

a housing, in which three ducts are arranged that are connected to one another;

a first shaft rotatably mounted in one of the three ducts;

a first flap mounted on the first shaft;

a second shaft arranged in another of the three ducts;

a second flap mounted on the second shaft;

an electric motor configured to drive the first shaft of the first flap;

a housing side stop;

a transmission mechanism that drives the second flap based on a movement of the first flap that comprises:

a cam disk arranged on the first shaft of the first flap; and a lever that bears against a circumference of the cam disk, the lever is fixedly connected to the second shaft of the second flap so that the lever rotates with the second shaft of the second flap, and a rotatable roller arranged at an end of the lever that faces the cam disk; and a spring having a first end arranged to press the lever against the cam disk and a second end arranged at the housing side stop;

wherein the housing is T-shaped, wherein a first duct is perpendicular to a second duct and a third duct, wherein the first shaft is arranged in the second duct and the second shaft is arranged in the third duct.

* * * * *